United States Patent
Guo et al.

(10) Patent No.: US 9,594,254 B2
(45) Date of Patent: Mar. 14, 2017

(54) PARALLAX BARRIER BASED STEREOSCOPIC DISPLAY DEVICE AND METHOD

(71) Applicant: SuperD Co. Ltd., Shenzhen (CN)

(72) Inventors: Fuzhong Guo, Shenzhen (CN); Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 95 days.

(21) Appl. No.: 14/296,947

(22) Filed: Jun. 5, 2014

(65) Prior Publication Data
US 2014/0362314 A1    Dec. 11, 2014

(30) Foreign Application Priority Data
Jun. 9, 2013    (CN) .......................... 2013 1 0231242

(51) Int. Cl.
*G02F 1/1335* (2006.01)
*G02B 27/22* (2006.01)
(Continued)

(52) U.S. Cl.
CPC ....... *G02B 27/2214* (2013.01); *G02F 1/1347* (2013.01); *H04N 13/0413* (2013.01);
(Continued)

(58) Field of Classification Search
CPC .... G02B 27/2214; G02B 27/26; G02B 27/22; G02B 27/225; G02B 27/2264;
(Continued)

(56) References Cited

U.S. PATENT DOCUMENTS 5,969,850 A * 10/1999 Harrold .............. G02B 27/2214
                                                        348/E13.004
8,059,063 B2 * 11/2011 Nam .................. H04N 13/0409
                                                        345/6
(Continued)

FOREIGN PATENT DOCUMENTS

CN    102914892 A    2/2013
CN    202735597 U    2/2013
CN    103123557 A    5/2013

*Primary Examiner* — Thoi Duong
(74) *Attorney, Agent, or Firm* — Anova Law Group, PLLC (57) ABSTRACT

A parallax barrier device includes a first electrode, a second electrode, a liquid crystal layer, a polarizer, and a controller. The first electrode includes a plurality of first sub-electrodes, and the second electrode includes a plurality of second sub-electrodes arranged intersecting the plurality of first sub-electrodes. The liquid crystal layer is disposed between the first electrodes and the second electrode, and the liquid crystal layer forms respective display windows corresponding to regions formed by the intersections of the first sub-electrodes and the second sub-electrodes. The polarizer is disposed on the first electrode or the second electrode on a side away from the liquid crystal layer. Further, the controller is coupled to the first electrodes and the second electrode and configured to control voltages on the plurality of first sub-electrodes and the plurality of second sub-electrodes to form a parallax barrier.

20 Claims, 5 Drawing Sheets (51) Int. Cl.
*G02F 1/1347* (2006.01)
*H04N 13/04* (2006.01)

(52) U.S. Cl.
CPC ..... *H04N 13/0454* (2013.01); *H04N 13/0456* (2013.01); *G02F 2203/62* (2013.01)

(58) Field of Classification Search
CPC .. G02B 27/2228; G02B 5/30; H04N 13/0409; H04N 13/0413; H04N 13/0452; H04N 13/0415; H04N 13/0497; H04N 13/0411; H04N 13/0447; H04N 13/0456; H04N 13/0477; H04N 2013/0081; G02F 1/133512; G02F 1/1347; G02F 1/1323; G02F 1/29; G02F 1/134309; G02F 1/1335; G02F 1/133; G02F 1/133528; G02F 1/13471; G02F 1/13306; G02F 1/1333; G02F 1/155; G02F 1/133371; G02F 1/134363; G02F 1/13476; G02F 2001/294; G02F 2001/134345; G02F 2001/134318; G02F 2001/133531; G02F 2001/133562; G02F 2001/134381; G02F 2201/44; G02F 2201/122; G02F 2201/124; G02F 2201/52; G02F 2201/30; G02F 2203/12; G09G 3/003; G09G 3/3611; G09G 3/3648; G09G 3/3406; G09G 3/3614; G09G 2310/0251; G09G 2300/023; G09G 2320/0252; G09G 2320/0238; G09G 2320/068; G09G 2354/00; B32B 2457/202; G06F 3/038; G06F 3/0412; G06F 3/044; G06F 3/041
USPC ..... 349/15, 96, 139, 201, 202, 61, 110, 123, 349/200, 77, 143, 157, 16, 193, 197, 33, 349/37, 7, 8, 187; 359/462, 376, 464, 359/465, 254, 315; 345/419, 102, 96, 87; 348/E13.03, 51, E13.044, E13.001, 348/E13.059, 42, 46, 57, 58; 356/12; 353/7

See application file for complete search history.

(56) References Cited

U.S. PATENT DOCUMENTS

| | | | |
|---|---|---|---|
| 9,188,801 B2 * | 11/2015 | Takama | G02B 27/22 |
| 2006/0146208 A1 | 7/2006 | Kim | |
| 2009/0002267 A1 | 1/2009 | Nam et al. | |
| 2011/0170026 A1 * | 7/2011 | Lin | G02B 27/2214 349/15 |
| 2012/0038854 A1 * | 2/2012 | Inoue | G02B 27/2214 349/96 |

* cited by examiner

PARALLAX BARRIER BASED STEREOSCOPIC DISPLAY DEVICE AND METHOD

CROSS-REFERENCES TO RELATED APPLICATIONS

This application claims priority of Chinese Patent Application No. CN201310231242.7, filed on Jun. 9, 2013, the entire contents of which are incorporated by reference herein.

FIELD OF THE INVENTION

The present invention generally relates to the field of display technology and, more particularly, to a parallax barrier device for stereoscopic display and a stereoscopic display device and method.

BACKGROUND

With the development of the display technologies, three-dimensional (3D) display technology has been developed with a variety of display modes to generate stereoscopic vision for the viewer. The stereoscopic vision can be generated when the left eye and the right eye of the viewer receive images at different angles, which are further combined by the brain, such that the viewer can sense the layering and depth perception of objects for 3D display.

Currently, 3D display devices can be divided into passive 3D display devices and automatic 3D display devices. When using a passive 3D display device, the viewer needs to wear auxiliary devices such as glasses or helmet, etc. The automatic 3D display devices are also called autostereoscopic display devices, i.e., the viewer does not need the help of any auxiliary device to see the stereoscopic images. In general, an autostereoscopic display device often uses a lenticular lens array or a parallax barrier, etc., to achieve the 3D display. The lenticular or cylindrical lens array usually has a complex manufacturing process, but has high brightness. On the other hand, a parallax barrier can lose certain brightness, but has a simple manufacturing process and is relatively easy for mass production and, thus, is also a popular means to achieve autostereoscopic display.

Parallax barrier is based on the principle of pinhole imaging, projecting light emitting from a display panel into the left eye and the right eye of the viewer, respectively. An existing parallax barrier device can be a single layer of transparent medium, and opaque materials are then plated on the transparent medium with strip-shaped portions etched away for passing light, parallel to each other, to form a black-and-white grating, i.e., the parallax barrier. The existing parallax barrier device can also include a liquid crystal cell with a liquid crystal layer, where the liquid crystal molecules can be rotated by a control voltage. With the addition of polarizer to the liquid crystal cell, the liquid crystal cell can form a black-and-white grating, i.e., the parallax barrier.

Figure 1:
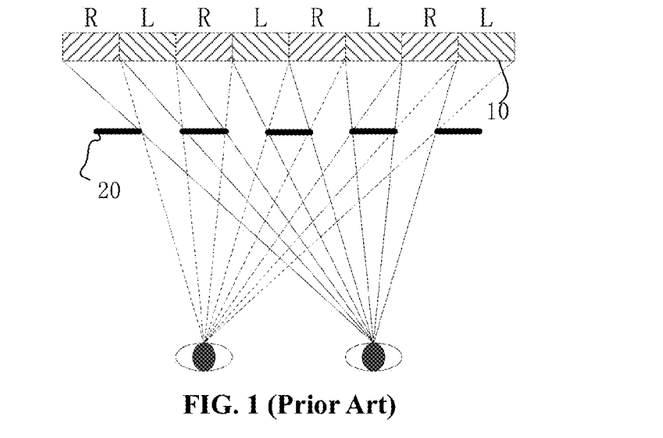
FIG. 1 is a schematic block diagram of an existing parallax barrier.

Referring to FIG. 1, a display panel 10 is provided to display 2D/3D images, and a parallax barrier 20 is disposed over the display panel 10. When a liquid crystal cell is used to form the parallax barrier, not only 3D image view can be achieved, but 2D/3D switching can also be achieved. Using the birefringence property of the liquid crystal molecules to change the polarization state of the emitting light, together with a polarizer, transparent and opaque grating structures (e.g., liquid crystal slits) can be formed, forming the parallax barrier. When in the 2D mode, the control voltage is turned off and 2D images can be displayed.

However, existing liquid crystal slit technologies often can only achieve full-screen 2D/3D switching. That is, the viewers often cannot simultaneously view contents containing both 2D and 3D information. The disclosed method and device are directed to solve one or more problems set forth above and other problems.

BRIEF SUMMARY OF THE DISCLOSURE

One aspect of the present disclosure includes a parallax barrier device. The parallax barrier device includes a first electrode, a second electrode, a liquid crystal layer, a polarizer, and a controller. The first electrode includes a plurality of first sub-electrodes, and the second electrode includes a plurality of second sub-electrodes arranged intersecting the plurality of first sub-electrodes. The liquid crystal layer is disposed between the first electrode and the second electrode, and the liquid crystal layer forms respective display windows corresponding to regions formed by the intersections of the first sub-electrodes and the second sub-electrodes. The polarizer is disposed on the first electrode or the second electrode on a side away from the liquid crystal layer. Further, the controller is coupled to the first electrode and the second electrode and configured to control voltages on the plurality of first sub-electrodes and the plurality of second sub-electrodes to cause the display windows of the liquid crystal layer to have different voltage differences, such that some of incident linearly polarized light passing through the display windows passes through the polarizer and some other incident polarized light passing through the display windows does not pass through polarizer, displaying a pattern of transparent and opaque display windows to form a parallax barrier.

Another aspect of the present disclosure includes a three-dimensional (3D) display device. The 3D display device include a parallax barrier device, and a display unit coupled to the parallax barrier device and configured to provide incident linearly polarized light of images to the parallax barrier device. The parallax barrier device includes a first electrode, a second electrode, a liquid crystal layer, a polarizer, and a controller. The first electrode includes a plurality of first sub-electrodes, and the second electrode includes a plurality of second sub-electrodes arranged intersecting the plurality of first sub-electrodes. The liquid crystal layer is disposed between the first electrode and the second electrode, and the liquid crystal layer forms respective display windows corresponding to regions formed by the intersections of the first sub-electrodes and the second sub-electrodes. The polarizer is disposed on the first electrode or the second electrode on a side away from the liquid crystal layer. Further, the controller is coupled to the first electrode and the second electrode and configured to control voltages on the plurality of first sub-electrodes and the plurality of second sub-electrodes to cause the display windows of the liquid crystal layer to have different voltage differences, such that some of the incident linearly polarized light passing through the display windows passes through the polarizer and some other incident polarized light passing through the display windows does not pass through polarizer, displaying a pattern of transparent and opaque display windows to form a parallax barrier.

Another aspect of the present disclosure includes display method for a three-dimensional (3D) display device based on a parallax barrier device. The parallax barrier device contains a first electrode including a plurality of first sub-electrodes, a second electrode including a plurality of second sub-electrodes arranged intersecting the plurality of first sub-electrodes, a liquid crystal layer disposed between the first electrode and the second electrode, the liquid crystal layer forming respective display windows corresponding to regions formed by the intersections of the first sub-electrodes and the second sub-electrodes, a polarizer disposed on the first electrode or the second electrode on a side away from the liquid crystal layer, and a controller coupled to the first electrode and the second electrode and configured to control voltages on the plurality of first sub-electrodes and the plurality of second sub-electrodes. The display method includes receiving content information to be displayed and determining whether the content information includes both two-dimensional (2D) information and 3D information. The method also includes, when it is determined that the content information includes both two-dimensional (2D) information and 3D information, controlling voltage difference of display windows of a 2D display region for the 2D information such that the incident linearly polarized light passing through the display windows of the 2D display region passes through the polarizer, and controlling voltage difference of display windows of a 3D display region for the 3D information to cause the display windows of the 3D display region to have different voltage differences, such that some of incident linearly polarized light passing through the display windows of the 3D display region passes through the polarizer and some other incident polarized light passing through the display windows of the 3D display region does not pass through polarizer, displaying a pattern of transparent and opaque display windows to form a parallax barrier.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are briefly described below, which are merely some exemplary embodiments of the present invention. For those skilled in the art, without inventive effort, other drawings may also be obtained according to these drawings and the descriptions included herein.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 9:
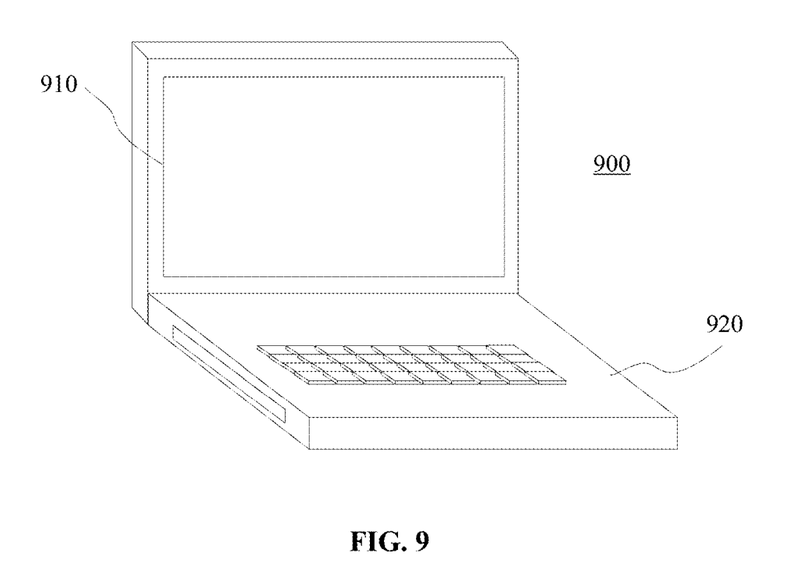
FIG. 9 illustrates an exemplary 3D display terminal device incorporating certain aspects of the invention.

A 3D display terminal device may include any appropriate type of terminal device with a three dimensional (3D) display feature (e.g., 3D TVs, 3D phones, 3D computers, etc.). The 3D display terminal device can contain a variety of 3D display technologies. FIG. 9 illustrates an exemplary 3D display terminal device incorporating certain aspects of the invention.

As shown in FIG. 9, a three-dimensional (3D) display terminal device 900 may include a 3D display 910 and a base 920. The 3D display terminal device 900 may include any appropriate system that is capable of processing and displaying two-dimensional (2D) or 3D images, such as a computer, a television set, a smart phone, or other consumer electronic devices. Although 3D display terminal device 900 is shown as a notebook computer, any device with computing power may be used.

The 3D display 910 may include any appropriate type of 3D display screen based on plasma display panel (PDP) display, field emission display (FED), cathode ray tube (CRT) display, liquid crystal display (LCD), organic light emitting diode (OLED) display, or other types of displays. Further, 3D display 910 may also be touch-sensitive, i.e., a touch screen. Other display types may also be used.

Figure 10:
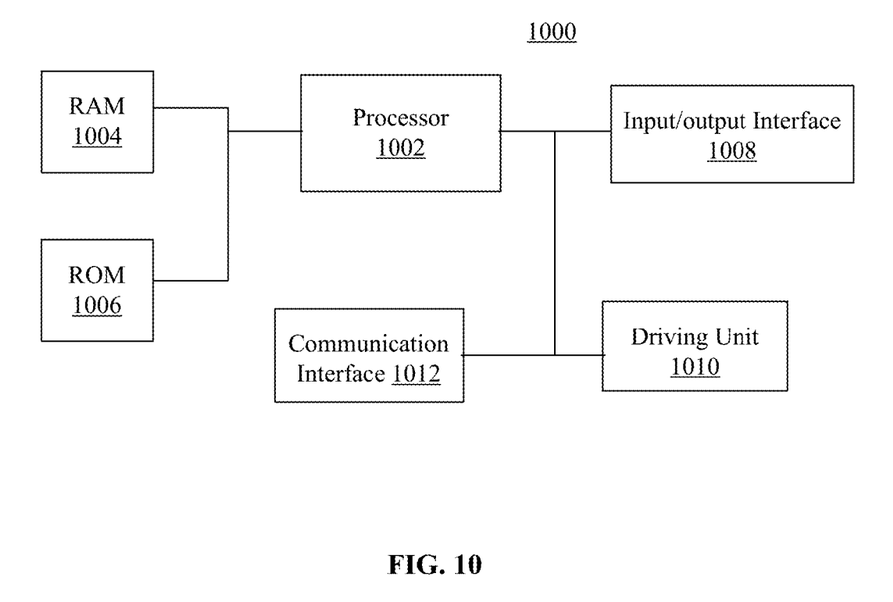
FIG. 10 illustrates a block diagram of a controller consistent with the disclosed embodiments.

Base 920 may include any appropriate structures and components to support operations of 3D display terminal device 900. For example, base 920 may include a controller to control operation of 3D display 910. FIG. 10 illustrates an exemplary controller consistent with the disclosed embodiments.

As shown in FIG. 10, controller 1000 may include a processor 1002, a random access memory (RAM) 1004, a read-only memory (ROM) 1006, an input/output interface 1008, a driving unit 1010, and a communication interface 1012. Other components may be added and certain devices may be removed without departing from the principles of the disclosed embodiments.

Processor 1002 may include any appropriate type of graphic processing unit (GPU), general-purpose microprocessor, digital signal processor (DSP) or microcontroller, and application specific integrated circuit (ASIC), etc. Processor 1002 may execute sequences of computer program instructions to perform various processes associated with 3D display terminal device 900. The computer program instructions may be loaded into RAM 1004 for execution by processor 1002 from read-only memory 1006 to process various 3D images.

Input/output interface 1008 may be provided for users to input information into 3D display terminal device 900 or for the users to receive information from 3D display terminal device 900. For example, input/output interface 1008 may include any appropriate input device, such as a remote control, a keyboard, a mouse, an electronic tablet, a voice communication device, or any other optical or wireless input device. Further, driving unit 1010 may include any appropriate driving circuitry to drive various devices, such as 3D display 910.

Further, communication interface 1012 may provide communication connections such that controller 1000 may be accessed by and/or communicate with other processors or systems through computer networks or other communication links via various communication protocols, such as transmission control protocol/internet protocol (TCP/IP) and hypertext transfer protocol (HTTP).

Figure 2:
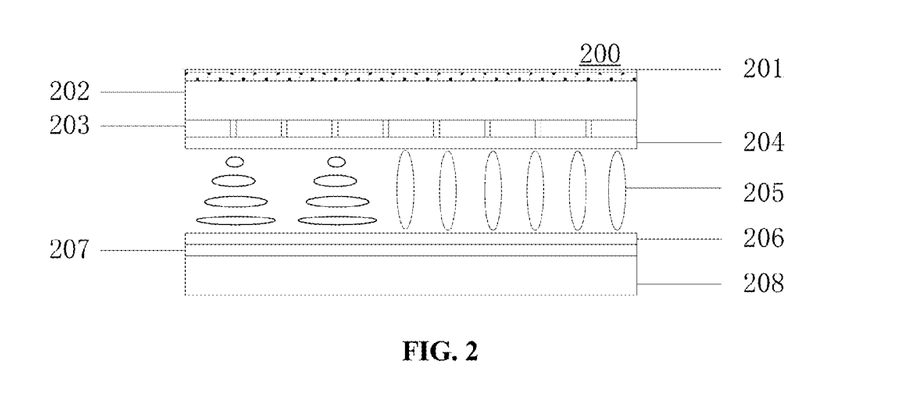
FIG. 2 illustrates a cross-sectional view of an exemplary parallax barrier device consistent with disclosed embodiments.
Figure 3:
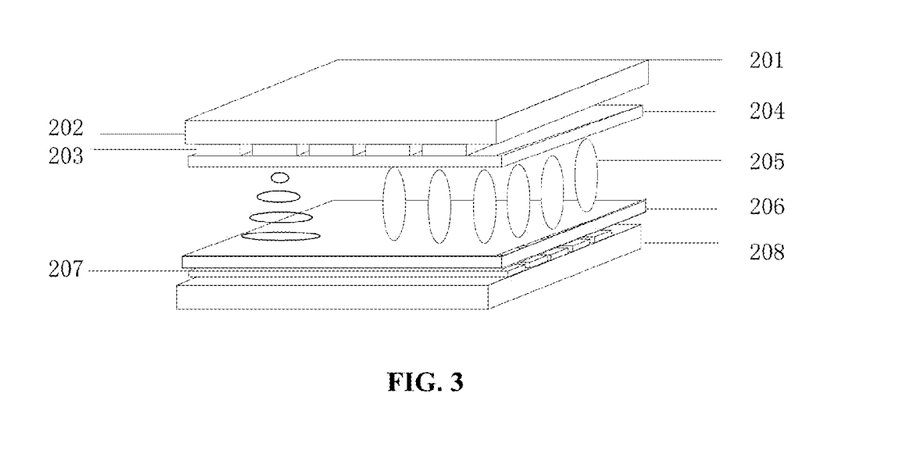
FIG. 3 illustrates a side view of an exemplary parallax barrier device consistent with disclosed embodiments.

During operation of the 3D display terminal device 900, image data containing both 2D and 3D images may be received from certain image input devices, such as a camera, a video player, etc. The image data may include pixel or a sub-pixel data of a plurality of 2D and 3D images. The 3D display 910 may include a liquid crystal parallax barrier device to effect 2D/3D image display. FIGS. 2-3 illustrate an exemplary parallax barrier device.

As shown in FIGS. 2-3, parallax barrier device 200 may include a polarizer 201, a first substrate 202, a first electrode 203, a first alignment layer 204, a liquid crystal layer 205, a second alignment layer 206, a second electrode 207, and a second substrate 208. Certain components may be omitted and other components may be included.

The first electrode 203 includes a plurality of first sub-electrodes. The second electrode 207 includes a plurality of second sub-electrodes, and the second sub-electrodes and the first sub-electrodes are arranged in a cross over or intersecting position.

The liquid crystal layer 205 includes a plurality of liquid crystal molecules. The first electrode 203 and the second electrode 207 are disposed on both sides of the liquid crystal layer 205. The liquid crystal layer 205 forms respective display windows corresponding to the regions formed by the intersections of the first sub-electrodes and the second sub-electrodes.

Further, polarizer 201 can be disposed on the first electrode 203 or the second electrode 207 on the side away from the liquid crystal layer and is configured to receive light emitting from the display panel.

In operation, various control voltages may be applied on the plurality of first sub-electrodes and/or the plurality of second sub-electrodes, such that the various display windows of the liquid crystal layer can have different voltages or different voltage differences. The rotation of the liquid crystal molecules within the different display windows are also different corresponding to the different control voltages applied on the display windows. Thus, some of the polarized light of images from the display panel can pass through some display windows and also pass through the polarizer 201, while some other polarized light of the images from the display panel cannot pass through the polarizer 201 after passing through some display windows. Thus, the display windows can display a pattern of brightness and darkness windows so as to form a parallax barrier.

Thus, according to the disclosed embodiments, the first electrode 203 and the second electrode 207 of the parallax barrier device both comprise a plurality of sub-electrodes, and the plurality of first sub-electrodes and the plurality of second sub-electrode are disposed in an intersectional or crossover arrangement. The intersected second sub-electrodes and first sub-electrodes can divide the liquid crystal layer into a plurality of display windows. By controlling the voltage differences applied between the first sub-electrodes and the second sub-electrodes, after the polarized image light passes through the plurality of display windows, some of the passing light can pass the polarizer while other portion of the passing light cannot pass the polarizer. Thus, the plurality of display windows show a pattern of bright-dark states, forming a transparent and opaque grating structure, i.e., forming a parallax barrier. Thus, integrated 2D and 3D display (i.e., displaying 2D and 3D information at the same time on the same display screen) can be achieved. Moreover, by controlling the voltage differences between the first sub-electrodes and the second sub-electrodes, the aperture ratio of the parallax barrier can be arbitrarily adjusted in real time.

Thus, according to disclosed embodiments, the birefringence of the liquid crystal is used to change the polarization state of the passing light such that the linearly polarized incident image light can be transmitted at respective different polarization directions. Under the effect of the polarizer as the outermost layer, a transparent and opaque grating structure can be formed, generating a parallax barrier.

Further, the parallax barrier device can be controlled by the controller (e.g., a computer or a microcontroller). The controller is coupled to the respective first sub-electrodes and second sub-electrodes to control the voltage applied on each of the first sub-electrodes and second sub-electrodes such that, after the polarized image light passes through the plurality of display windows, some of the passing light can pass the polarizer while some other passing light cannot pass the polarizer.

That is, the controller can implement the control on the voltage difference of each of the display windows of the liquid crystal layer. When the voltage difference applied on a display window is greater than the threshold voltage of the liquid crystal molecules of the liquid crystal layer, the display window is in the dark/opaque state. When the voltage difference applied on a display window is less than the threshold voltage of the liquid crystal molecules in the liquid crystal layer, the display window is in the bright/transparent state. Thus, by controlling whether the linear polarized light passing through each display window can pass through the polarizer, the plurality of display windows can be in the dark state or the bright state so as to form the parallax barrier.

The controller can also be configured to selectively control the voltage difference of one or more display windows, such that the voltage difference is greater than the threshold voltage of the liquid crystal molecules in the liquid crystal layer. The voltage difference control may be performed on selected one or more adjacent display windows, such as three laterally or horizontally adjacent display windows. Or voltage difference control may be performed on selected one or more non-adjacent display windows, such as three longitudinally or vertically spaced/separated display windows. By selectively controlling the voltage difference of the display windows, it can be arbitrarily controlled whether the linearly polarized light passing through any particular display window can pass through the polarizer, so that the plurality of display windows can be in the bright/dark state to form a parallax barrier.

The controller can also be configured to adjust the voltage of one or more sub-electrodes based on the display effect. For example, the controller may adjust the voltage of one or more sub-electrodes of the first electrode; may adjust the voltage of one or more sub-electrodes of the second electrode; or may simultaneously adjust the voltage of one or more sub-electrodes of the first electrode and one or more sub-electrodes of the second electrode, such that the voltage difference between each first sub-electrode and each second sub-electrode can be controlled to adjust the display effect.

Further, the shape of the first sub-electrode and/or the second sub-electrode may be one of strip, zigzag, or extended curve shaped, or other regular or irregular shape. In certain embodiments, each sub-electrode is strip shaped.

The sub-electrodes of the first electrode may be arranged in parallel, and the sub-electrodes of the second electrode may also be arranged in parallel. The angle formed between the first sub-electrodes and the second sub-electrodes may be approximately 60 to 120 degrees. For example, the first sub-electrodes and the second sub-electrodes may be disposed perpendicular to each other, i.e., the angle is formed by approximately 90 degrees.

When the first sub-electrodes and second sub-electrodes are disposed perpendicularly, by controlling the voltages on the respective sub-electrodes, it can be achieved that the voltage difference between horizontal sub-electrodes and vertical sub-electrode is greater than the threshold voltage of the liquid crystal molecules, so that the liquid crystal layer can display horizontal or vertical darkness to enable 3D display for horizontal screen or vertical screen. Further, by applying voltages on sub-electrodes from different rows and different columns, the bright/dark state of individual display windows can be individually and separately controlled. That is, the parallax barrier can realize bright and dark display windows.

Among the sub-electrodes of the first electrode or the second electrode, at least two adjacent sub-electrodes can form an electrode group or sub-electrode group. For each sub-electrode group, the display window corresponding to at least one sub-electrode and its respective intersecting sub-electrode is in the bright state, while all other display windows are in the dark state. In certain embodiments, in each sub-electrode group, when the display window corresponding to at least two sub-electrodes and the respective intersecting sub-electrodes is in the bright state, and other display windows are in the dark state, the at least two sub-electrodes are adjacent sub-electrodes.

Referring again to FIGS. 2 and 3, the parallax barrier device also includes the first substrate 202 and the second substrate 208. The first electrode 203 and the second electrode 207 are transparent and disposed on the inner side of the substrate 202 and the substrate 208, respectively. The first alignment layer 204 is disposed on top surface of the first electrode 203, and the second alignment layer 206 is disposed on top surface of the second electrode 207. The liquid crystal layer 205 is disposed between the first alignment layer 204 and the second alignment layer 206.

The first sub-electrodes are arranged on the first substrate 202 in parallel and at a predetermined interval from each other. The first alignment layer 204 is formed on the upper surface of each of the first sub-electrodes and in the gap between adjacent first sub-electrodes, such that the first sub-electrodes are insulated from each other. Similarly, the second sub-electrodes are arranged on the second substrate 208 in parallel and at a predetermined interval from each other. The second alignment layer 206 is formed on the upper surface of each of the second sub-electrodes and in the gap between adjacent second sub-electrodes, such that the second sub-electrodes are insulated from each other.

Further, the parallax barrier device also includes a sealant frame (not shown) for sealing the liquid crystal molecules between the two alignment layers 204 and 206. Further, one or more pads or spacers are placed between the two alignment layers 204 and 206 for setting the distance between the two alignment layers 204 and 206, and for ensuring the distance between the two alignment layers 204 and 206 is a predetermined distance.

Figure 4:
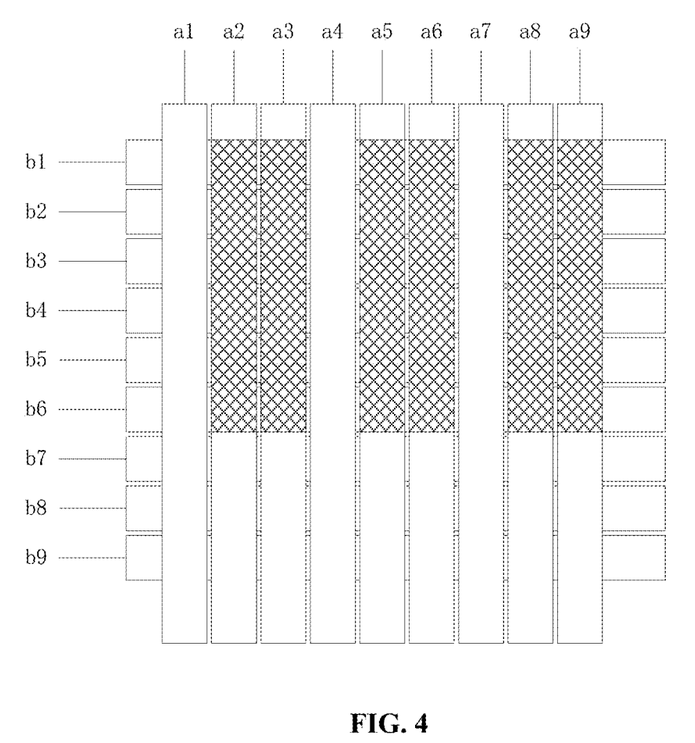
FIG. 4 illustrates an exemplary parallax barrier device with partially applied voltages consistent with disclosed embodiments.

FIG. 4 illustrates an exemplary parallax barrier with partially applied voltages. As shown in FIG. 4, the first electrode includes first strip sub-electrodes a1-a9 arranged in parallel at a first interval, and the second electrode includes second strip sub-electrodes b1-b9 arranged in parallel at a second interval. Thus, 9×9 display windows are formed by the sub-electrodes a1-a9 and the sub-electrodes b1-b9, each display window corresponds to a portion of liquid crystal molecules of the liquid crystal layer.

For the convenience of illustration, the 9×9 display windows shown in FIG. 4 can be viewed as a two-dimensional 9×9 matrix. The columns of the two-dimensional matrix represent the sub-electrodes of the first electrode 203, and the rows of the two-dimensional matrix represent the sub-electrodes of the second electrode 207. The display window corresponding to the i-th row (i=1, . . . , 9) and j-th column (j=1, . . . , 9) is represented by $a_{ij}$.

When no voltage is applied on the i-th row sub-electrode and the j-th column sub-electrode, or when voltages $U_i$ and $U_j$ are respectively applied on the i-th row sub-electrode and the j-th column sub-electrode and the difference between $U_i$ and $U_j$ is less than the threshold voltage of the liquid crystal molecules, under the effect of the first alignment layer 204 and the second alignment layer 206, the liquid crystal molecules within $a_{ij}$ are twisted by 90 degrees. Thus, the linearly polarized incident light with the polarization direction parallel to the rubbing direction of the incident substrate passes through $a_{ij}$, and the outgoing light is linearly polarized light with the polarization direction perpendicular to the polarization direction of the incident linearly polarized light. At this time, the polarization direction of the outgoing light is the same as the polarization direction of the polarizer 201, i.e., the outgoing light can pass through the polarizer 201, and the display window $a_{ij}$ is in the bright state.

When voltages $U_i$ and $U_j$ are respectively applied on the i-th row sub-electrode and the j-th column sub-electrode and the voltage difference between $U_i$ and $U_j$ is greater than the threshold voltage of the liquid crystal molecules, under the effect of the electric field created by the voltage difference, the long axis of the liquid crystal molecules within display window $a_{ij}$ is rotated to be perpendicular to the direction of the first substrate 202 and the second substrate 208. At this time, display window $a_{ij}$ does not change the polarization state of the incident linearly polarized light, and the polarization direction of the outgoing polarized light (i.e., polarized light passing through $a_{ij}$) is perpendicular to the polarization direction of the polarizer 201, and display window $a_{ij}$ is in the dark state. Thus, by applying voltages on sub-electrodes from different rows and different columns, the bright/dark state of individual display windows can be individually and separately controlled. That is, the parallax barrier can realize bright and dark display windows control.

More specifically, for example, voltage $U_0$ is applied on the second sub-electrodes b1 to b6, voltage $U_1$ is applied on the first sub-electrodes a2, a3, a5, a6, a8, a9, and no voltage is applied on the remaining sub-electrodes. The voltages satisfy the following relation: $|U_1-U_0|$ is greater than the threshold voltage $U_{th}$ of the liquid crystal molecules; and both $|U_0|$ and $|U_1|$ are less than $U_{th}$.

Under such voltage relationships, as shown in FIG. 4, the long axis direction of liquid crystal molecules within the display windows corresponding to the above sub-electrodes (shown in shaded area) is perpendicular to the substrates, and cannot rotate the polarization state of the incident light by 90 degrees. Thus, the outgoing light from these display windows has a polarization direction perpendicular to the polarization direction of the polarizer 201, and the outgoing light from these display windows cannot pass through the polarizer 201, forming dark display windows.

If using every 3 column sub-electrodes as a period, a parallax barrier with an aperture ratio of 1/3 is formed.

Clearly, if selecting only one second sub-electrode within the period and applying voltage $U_0$ on the selected second sub-electrode, while keeping other conditions unchanged, a parallax barrier with an aperture ratio of 2/3 is formed. Thus, the aperture ratio of the parallax barrier can be adjusted. Because no voltage is applied on the sub-electrodes of other display windows or the applied voltage on the liquid crystal molecules is less than $U_{th}$, the incident light is capable of passing through the liquid crystal layer and the polarizer 201 to form bright regions, without forming parallax barriers.

The controller may determine the voltages to be applied on the first sub-electrodes and the second sub-electrodes based on the content information of the images on the display panel. For example, if the controller determines that content information of a display region is 2D information, the controller may control the voltages for the display windows of the display region to pass the image light. On the other hand, if the controller determines that content information of a display region is 3D information, the controller may control the voltages for the display windows of the display region to form a parallax barrier to effect 3D display.

Figure 5:
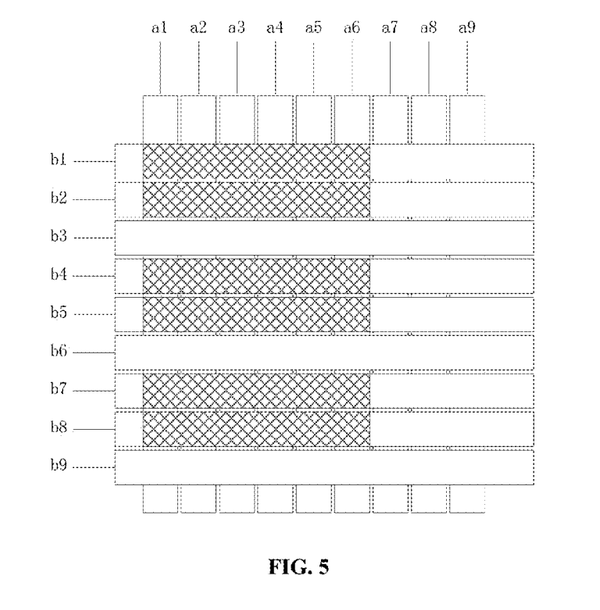
FIG. 5 illustrates another exemplary parallax barrier device with partially applied voltages consistent with disclosed embodiments.

FIG. 5 illustrates another exemplary parallax barrier with partially applied voltages. As shown in FIG. 5, voltage $U_0$ is applied on the first sub-electrodes a1 to a6, voltage $U_1$ is applied on the second sub-electrodes b1, b2, b4, b5, b7, and b8, and no voltage is applied on the remaining sub-electrodes. The parallax barrier can be formed as shown in FIG. 5, the long axis direction of liquid crystal molecules corresponding to the respective sub-electrodes is arranged perpendicular to the substrate, forming dark areas. As shown in FIGS. 4 and 5, respectively, dark areas are formed vertically and horizontally, meeting the need of vertical screen and horizontal screen viewing.

Each of the first electrode and the second electrode includes a plurality of strip sub-electrodes, arranged overlapped with each other. The distance between two sub-electrodes adjacent to a same sub-electrode is less than or equal to the width of the same sub-electrode, such that adjacent sub-electrodes are overlapped with each other, eliminating the weak crosstalk caused by the small gap between the sub-electrodes and improving the 3D display effects.

Figure 6:
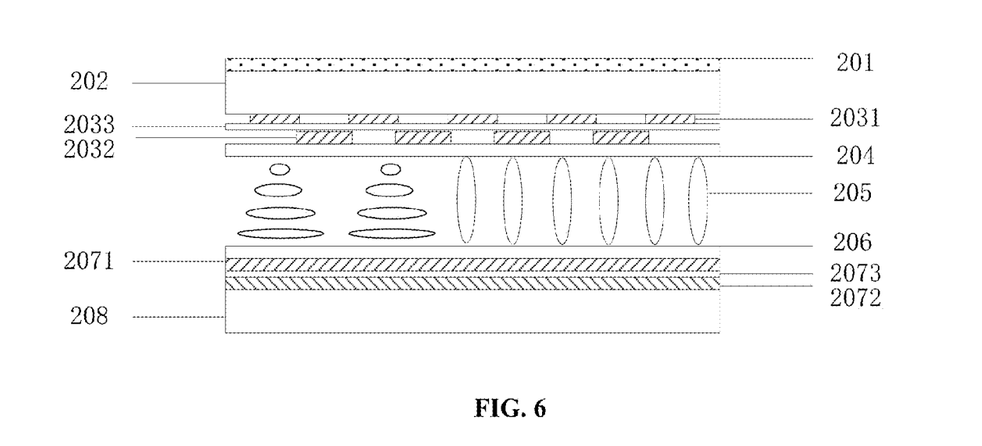
FIG. 6 illustrates another exemplary parallax barrier device consistent with disclosed embodiments.

FIG. 6 illustrates another parallax barrier device. As shown in FIG. 6, the first electrode and the second electrode each includes a plurality of strip sub-electrodes disposed in two layers. The first electrode 203 includes horizontally arranged plurality of strip sub-electrodes, part of the strip sub-electrodes is disposed on the first layer 2031, and the other part of the strip sub-electrodes is disposed on the second layer 2032. The strip sub-electrodes on the first layer 2031 overlap with the strip sub-electrodes on the second layer 2032, and adjacent strip sub-electrodes are disposed on different layers.

Further, the gap between two adjacent strip sub-electrodes on the first layer 2031 face a strip sub-electrode on the second layer 2032, and the width of the strip sub-electrode on the second layer 2032 is greater than or equal to the distance between the two adjacent strip sub-electrodes on the first layer 2031. A first insulating layer 2033 is provided between the first layer 2031 and the second layer 2032.

Similarly, the second electrode 207 includes vertically arranged plurality of strip-shaped second sub-electrodes, arranged perpendicular to the first sub-electrodes. The second sub-electrodes are disposed on a third layer 2071 and a fourth layer 2072. A second insulating layer 2073 is provided between the third layer 2071 and the fourth layer 2072. The gap between two adjacent strip sub-electrodes on the third layer 2071 face a strip sub-electrode on the fourth layer 2072, and the width of the strip sub-electrode on the fourth layer 2072 is greater than or equal to the distance between the two adjacent strip sub-electrodes on the third layer 2071.

Figure 7:
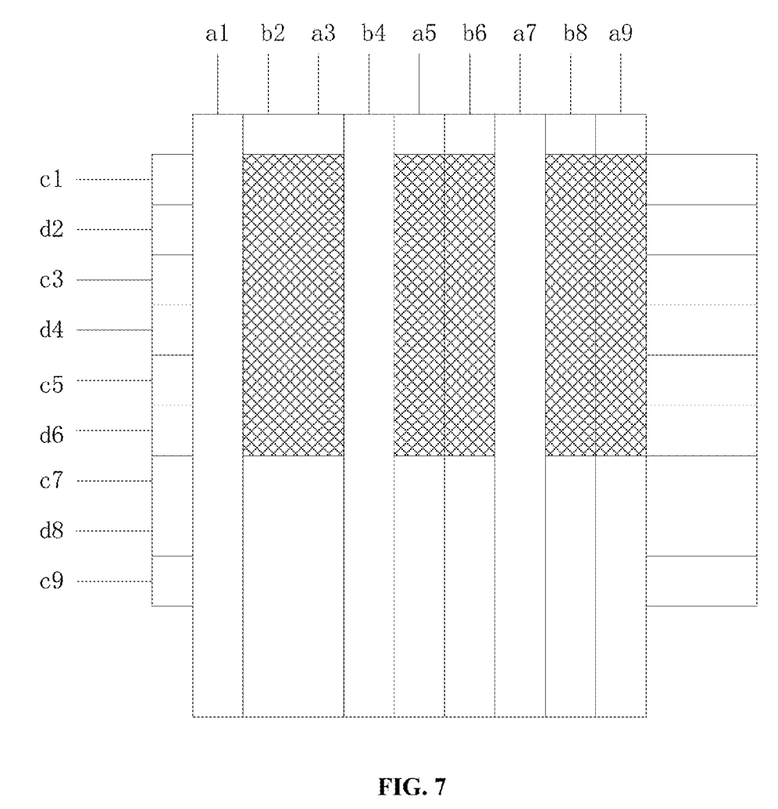
FIG. 7 illustrates another exemplary parallax barrier device with partially applied voltages consistent with disclosed embodiments.

FIG. 7 illustrates another exemplary parallax barrier with partially applied voltages. As shown in FIG. 7, sub-electrodes on the first layer are represented as ai (i is an odd number), sub-electrodes on the second layer are represented as bj (j is an even number), sub-electrodes on the third layer are represented as cm (m is an odd number), and sub-electrodes on the fourth layer are represented as dn (n is an even number), respectively.

Further, voltage $U_0$ is applied on sub-electrodes of the first layer a3, a5, a9, and on sub-electrodes of the second layer b2, b6, b8. Voltage $U_1$ is applied on sub-electrodes of the third layer c1 to c5, and on sub-electrodes of the fourth layer d2 to d6. No voltage is applied on the remaining sub-electrodes. The voltages satisfy the following relation: $|U_1 - U_0|$ is greater than the threshold voltage $U_{th}$ of the liquid crystal molecules; and both $|U_0|$ and $|U_1|$ are less than $U_{th}$.

Under such voltage relationships, as shown in FIG. 7, the long axis direction of liquid crystal molecules within the display windows corresponding to the above sub-electrodes (shown in shaded area) is perpendicular to the substrates, and cannot rotate the polarization state of the incident light by 90 degrees. Thus, the outgoing light from these display windows has a polarization direction perpendicular to the polarization direction of the polarizer 201, and the outgoing light from these display windows cannot pass through the polarizer 201, forming dark display windows.

If using every 3 column sub-electrodes as a period, a parallax barrier with an aperture ratio of 1/3 is formed. Clearly, if selecting only one sub-electrode within the period, such as a3, b6, a9, and applying voltage $U_0$ on the selected sub-electrode, while keeping other conditions unchanged, a parallax barrier with an aperture ratio of 2/3 can be formed. Thus, the aperture ratio of the parallax barrier can be adjusted. Because no voltage is applied on the sub-electrodes of other display windows or the applied voltage on the liquid crystal molecules is less than $U_{th}$, the incident light is capable of passing through the liquid crystal layer and the polarizer 201 to form bright regions, without forming parallax barriers.

Figure 8:
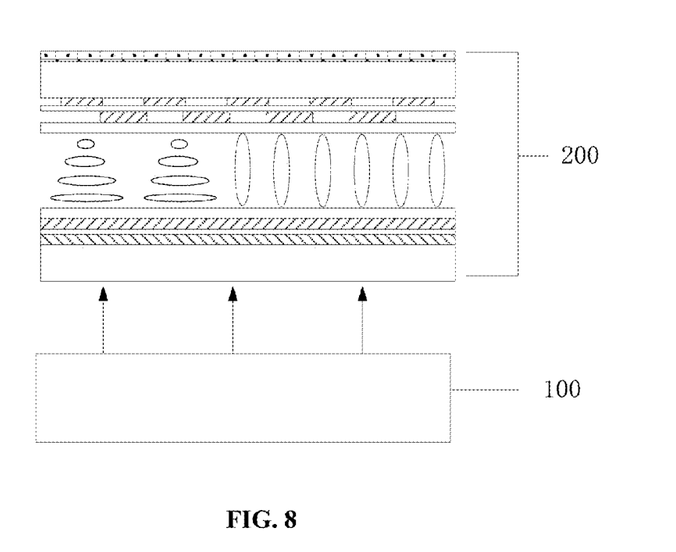
FIG. 8 illustrates a structural view of a 3D display terminal device consistent with disclosed embodiments.

FIG. 8 illustrates an exemplary 3D display deice. As shown in FIG. 8, the 3D display device includes a parallax barrier device 200 and a display unit 100. As explained, the parallax barrier device 200 includes, for example, a polarizer, two substrates, and a liquid crystal layer between the two substrates. The first electrode and the second electrodes are disposed on the inner sides of the substrates. The display unit is disposed on one side of one substrate away from the liquid crystal layer, and the polarizer is disposed on one side of the other substrate away from the liquid crystal layer.

The display unit 100 provides linearly polarized image light. The display unit 100 can be any appropriate device provides linearly polarized image light, such as a display panel. The linearly polarized image light is provided to the liquid crystal layer. The pixels of the display unit match the display windows of the parallax barrier device.

The display unit may also selectively provide linearly polarized image light to one or more display windows. For example, the display unit may provide linearly polarized image light the display windows of a particular sub-electrode row or a particular sub-electrode column, selectively providing linearly polarized image light to certain display windows. The pixels of the display unit match the horizontal display windows of the parallax barrier device, e.g., at least one row of pixels of the display unit correspond to at least one row of horizontal display windows. Of course, the pixels of the display unit can also be configured to match the vertical display windows of the parallax barrier device, e.g., at least one column of pixels of the display unit correspond to at least one column of vertical display windows. A parallax barrier for vertical screen or horizontal screen may be realized.

According to the disclosed embodiments, the parallax barrier device can be used in a 2D-3D stereoscopic display device to providing a variety functions, such as window-based stereoscopic image display, i.e., integrated 2D-3D image display, compatible horizontal and vertical screen stereoscopic display, and adjustment of the aperture ratio of the parallax barrier, etc.

According to the disclosed embodiments, the stereoscopic display device uses liquid crystal cell to form a parallax barrier. The parallax barrier includes a first electrode and a second electrode, comprising a plurality of first sub-electrodes and a plurality of second sub-electrodes, respectively. The first sub-electrodes and the second sub-electrodes are arranged intersecting or crossover each other. The intersected first sub-electrodes and second sub-electrodes divide the liquid crystal layer into a plurality of display windows. By controlling the voltage difference between the first sub-electrodes and the second sub-electrodes, when the linearly polarized image light provided by the display unit 100 passes through the display windows, part of the outgoing linearly polarized image light can pass through the polarizer while other part of the outgoing linearly polarized image light cannot pass through the polarizer, forming transparent and opaque grating structures. Thus, a parallax barrier is formed, and integrated 2D and 3D display (i.e., 2D and 3D images displayed on the same display screen at the same time) can be achieved. Further, by controlling the voltage difference between the intersected first sub-electrodes and second sub-electrodes, the aperture ratio of the parallax barrier can be arbitrarily adjusted.

The above-described embodiments are merely illustrative, and are not limiting. Those skilled in the art can understand that various modifications to these embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A parallax barrier device, comprising:
    a first electrode including a plurality of first sub-electrodes;
    a second electrode including a plurality of second sub-electrodes arranged intersecting the plurality of first sub-electrodes;
    a liquid crystal layer disposed between the first electrode and the second electrode, the liquid crystal layer forming respective display windows corresponding to regions formed by the intersections of the first sub-electrodes and the second sub-electrodes;
    a polarizer disposed on the first electrode or the second electrode on a side away from the liquid crystal layer; and
    a controller coupled to the first electrode and the second electrode and configured to control voltages on each of the plurality of first sub-electrodes and each of the plurality of second sub-electrodes to cause the display windows of the liquid crystal layer to have different voltage differences, wherein when no voltage is applied on an i-th second sub-electrode and a j-th first sub-electrode, or when the voltage difference between voltages respectively applied on the i-th second sub-electrode and the j-th first sub-electrode is less than a threshold voltage of liquid crystal molecules within the liquid crystal layer, the liquid crystal molecules within the display window corresponding to the region formed by the intersection of the j-th first sub-electrode and the i-th second sub-electrode are twisted by 90 degrees, where i and j are positive integers, respectively, when the voltage difference between the voltages respectively applied on the i-th second sub-electrode and the j-th first sub-electrode is greater than the threshold voltage of the liquid crystal molecules within the liquid crystal layer, a long axis of the liquid crystal molecules within the display window corresponding to the region formed by the intersection of the j-th first sub-electrode and the i-th second sub-electrode is rotated to be perpendicular to the first substrate and the second substrate, such that incident linearly polarized light passing through the display windows of a 2D display region for 2D information passes through the polarizer and, meanwhile, some of incident linearly polarized light passing through the display windows of a 3D display region for 3D information passes through the polarizer and some other incident polarized light passing through the display windows of the 3D display region for the 3D information does not pass through the polarizer, displaying a pattern of transparent and opaque display windows to form a parallax barrier, and enabling users to simultaneously view content containing both 2D information and 3D information.

2. The parallax barrier device according to claim 1, wherein:
    the controller is configured to selectively control voltage difference of at least one display window corresponding to the region formed by the intersection of the j-th first sub-electrode and the i-th second sub-electrode, such that when the voltage difference is greater than the threshold voltage of the liquid crystal molecules in the liquid crystal layer, the long axis of the liquid crystal molecules is rotated to be perpendicular to the first substrate and the second substrate, and the at least one display window is in a dark state, and
    when the voltage difference is less than the threshold voltage of the liquid crystal molecules in the liquid crystal layer, the liquid crystal molecules are twisted by 90 degrees, and the at least one display window is in a bright state.

3. The parallax barrier device according to claim 1, wherein:
    the controller is configured to dynamically adjust a voltage of at least one sub-electrode based on display effect.

4. The parallax barrier device according to claim 1, wherein:
    the plurality of first sub-electrodes and the plurality of second sub-electrodes are strip shaped electrodes;
    the plurality of first sub-electrodes are arranged in parallel at a first interval; and
    the plurality of second sub-electrodes are arranged in parallel at a second interval.

5. The parallax barrier device according to claim 4, wherein:

an intersecting angle between the first sub-electrodes and the second sub-electrodes is in a range of 60 to 120 degrees.

6. The parallax barrier device according to claim 1, wherein:
at least two adjacent sub-electrodes of the first electrode or the second electrode form a sub-electrode group;
some or all display windows corresponding to at least one sub-electrode in the sub-electrode group and its respective intersecting sub-electrode are in the bright state, while all other display windows are in the dark state.

7. The parallax barrier device according to claim 6, wherein:
when some or all display windows corresponding to at least two sub-electrodes in the sub-electrode group and respective intersecting sub-electrodes are in the bright state, while all other display windows are in the dark state, the at least two sub-electrodes are adjacent sub-electrodes.

8. The parallax barrier device according to claim 1, wherein:
the sub-electrodes of at least one of the first electrode and the second electrode are strip electrodes arranged at two layers, a first layer and a second layer;
sub-electrodes on the first layer overlap sub-electrodes on the second layer;
a gap between two adjacent strip sub-electrodes on one layer is less than a width of a strip sub-electrode on the other layer facing the gap.

9. The parallax barrier device according to claim 8, wherein:
an insulating layer disposed between the first layer and the second layer.

10. The parallax barrier device according to claim 1, wherein:
a first substrate on which the first electrode is formed;
a second substrate on which the second electrode is formed;
a first alignment layer formed on the first electrode on a side facing the liquid crystal layer; and
a second alignment layer formed on the second electrode on a side facing the liquid crystal layer.

11. A three-dimensional (3D) display device, comprising:
a parallax barrier device;
a display unit coupled to the parallax barrier device and configured to provide incident linearly polarized light of images to the parallax barrier device,
wherein the parallax barrier device comprises:
a first electrode including a plurality of first sub-electrodes;
a second electrode including a plurality of second sub-electrodes arranged intersecting the plurality of first sub-electrodes;
a liquid crystal layer disposed between the first electrode and the second electrode, the liquid crystal layer forming respective display windows corresponding to regions formed by the intersections of the first sub-electrodes and the second sub-electrodes;
a polarizer disposed on the first electrode or the second electrode on a side away from the display unit; and
a controller coupled to the first electrode and the second electrode and configured to control voltages on each of the plurality of first sub-electrodes and each of the plurality of second sub-electrodes to cause the display windows of the liquid crystal layer to have different voltage differences, wherein when no voltage is applied on an i-th second sub-electrode and a j-th first sub-electrode, or when the voltage difference between voltages respectively applied on the i-th second sub-electrode and the j-th first sub-electrode is less than a threshold voltage of liquid crystal molecules within the liquid crystal layer, the liquid crystal molecules within the display window corresponding to the region formed by the intersection of the j-th first sub-electrode and the i-th second sub-electrode are twisted by 90 degrees, where i and j are positive integers, respectively, when the voltage difference between the voltages respectively applied on the i-th second sub-electrode and the j-th first sub-electrode is greater than the threshold voltage of the liquid crystal molecules within the liquid crystal layer, a long axis of the liquid crystal molecules within the display window corresponding to the region formed by the intersection of the j-th first sub-electrode and the i-th second sub-electrode is rotated to be perpendicular to the first substrate and the second substrate, such that incident linearly polarized light passing through the display windows of a 2D display region passes through the polarizer and, meanwhile, some of incident linearly polarized light passing through the display windows of a 3D display region passes through the polarizer and some other incident polarized light passing through the display windows of the 3D display region does not pass through the polarizer, displaying a pattern of transparent and opaque display windows to form a parallax barrier, and enabling users to simultaneously view content containing both 2D information and 3D information.

12. The 3D display device according to claim 11, wherein:
the controller is configured to selectively control voltage difference of at least one display window corresponding to the region formed by the intersection of the j-th first sub-electrode and the i-th second sub-electrode, such that when the voltage difference is greater than the threshold voltage of the liquid crystal molecules in the liquid crystal layer, the long axis of the liquid crystal molecules is rotated to be perpendicular to the first substrate and the second substrate, and the at least one display window is in a dark state, and
when the voltage difference is less than the threshold voltage of the liquid crystal molecules in the liquid crystal layer, the liquid crystal molecules are twisted by 90 degrees, and the at least one display window is in a bright state.

13. The 3D display device according to claim 11, wherein:
the controller is configured to dynamically adjust a voltage of at least one sub-electrode based on display effect.

14. The 3D display device according to claim 11, wherein:
the plurality of first sub-electrodes and the plurality of second sub-electrodes are strip shaped electrodes;
the plurality of first sub-electrodes are arranged in parallel at a first interval; and
the plurality of second sub-electrodes are arranged in parallel at a second interval.

15. The 3D display device according to claim 11, wherein:
pixels of the display unit match the display windows of the parallax barrier device.

16. The 3D display device according to claim 15, wherein:
the pixels of the display unit match horizontal display windows of the parallax barrier device.

17. The 3D display device according to claim 15, wherein:
the pixels of the display unit match vertical display windows of the parallax barrier device.

18. A display method for a three-dimensional (3D) display device based on a parallax barrier device containing a first electrode including a plurality of first sub-electrodes, a second electrode including a plurality of second sub-electrodes arranged intersecting the plurality of first sub-electrodes, a liquid crystal layer disposed between the first electrode and the second electrode, the liquid crystal layer forming respective display windows corresponding to regions formed by the intersections of the first sub-electrodes and the second sub-electrodes, a polarizer disposed on the first electrode or the second electrode on a side away from the liquid crystal layer, and a controller coupled to the first electrode and the second electrode and configured to control voltages on each of the plurality of first sub-electrodes and each of the plurality of second sub-electrodes, wherein when no voltage is applied on an i-th second sub-electrode and a j-th first sub-electrode, or when the voltage difference between voltages respectively applied on the i-th second sub-electrode and the j-th first sub-electrode is less than a threshold voltage of liquid crystal molecules within the liquid crystal layer, the liquid crystal molecules within the display window corresponding to the region formed by the intersection of the j-th first sub-electrode and the i-th second sub-electrode are twisted by 90 degrees, where i and j are positive integers, respectively, when the voltage difference between the voltages respectively applied on the i-th second sub-electrode and the j-th first sub-electrode is greater than the threshold voltage of the liquid crystal molecules within the liquid crystal layer, a long axis of the liquid crystal molecules within the display window corresponding to the region formed by the intersection of the j-th first sub-electrode and the i-th second sub-electrode is rotated to be perpendicular to the first substrate and the second substrate, the display method comprising:

receiving content information to be displayed;

determining whether the content information includes both two-dimensional (2D) information and 3D information; and when it is determined that the content information includes both two-dimensional (2D) information and 3D information, controlling voltage difference of display windows of a 2D display region for the 2D information such that the incident linearly polarized light passing through the display windows of the 2D display region passes through the polarizer, and controlling voltage difference of display windows of a 3D display region for the 3D information to cause the display windows of the 3D display region to have different voltage differences, such that some of incident linearly polarized light passing through the display windows of the 3D display region passes through the polarizer and some other incident polarized light passing through the display windows of the 3D display region does not pass through the polarizer, displaying a pattern of transparent and opaque display windows to form a parallax barrier, and enabling users to simultaneously view the content information containing both 2D information and 3D information.

19. The display method according to claim 18, wherein:
the controller is configured to dynamically adjust a voltage of at least one sub-electrode based on display effect.

20. The display method according to claim 18, wherein:
the plurality of first sub-electrodes and the plurality of second sub-electrodes are strip shaped electrodes;
the plurality of first sub-electrodes are arranged in parallel at a first interval; and
the plurality of second sub-electrodes are arranged in parallel at a second interval.

* * * * *